(12) United States Patent
Kolosnitsyn et al.

(10) Patent No.: US 8,679,684 B2
(45) Date of Patent: Mar. 25, 2014

(54) ELECTROLYTE FOR LITHIUM-SULPHUR BATTERIES AND LITHIUM-SULPHUR BATTERIES USING THE SAME

(75) Inventors: Vladimir Kolosnitsyn, Ufa (RU); Elena Karaseva, Ufa (RU)

(73) Assignee: Oxis Energy, Ltd., Oxfordshire (GB)

( * ) Notice: Subject to any disclaimer, the term of this patent is extended or adjusted under 35 U.S.C. 154(b) by 1224 days.

(21) Appl. No.: 11/290,825

(22) Filed: Dec. 1, 2005

(65) Prior Publication Data

US 2006/0121355 A1    Jun. 8, 2006

Related U.S. Application Data

(60) Provisional application No. 60/657,436, filed on Mar. 2, 2005.

(30) Foreign Application Priority Data

Dec. 2, 2004 (RU) ................................ 2004135236
Mar. 2, 2005 (GB) ................................... 0504290.8

(51) Int. Cl.
   *H01M 4/58* (2010.01)

(52) U.S. Cl.
   USPC ........................................................... 429/329

(58) Field of Classification Search
   None
   See application file for complete search history.

(56) References Cited

U.S. PATENT DOCUMENTS

| | | | |
|---|---|---|---|
| 3,639,174 A | | 2/1972 | Kegelman |
| 3,907,597 A | * | 9/1975 | Mellors .......................... 429/327 |
| 4,154,906 A | | 5/1979 | Bubnick et al. |
| 4,303,748 A | | 12/1981 | Armand et al. |
| 4,410,609 A | | 10/1983 | Peled et al. |
| 4,503,234 A | * | 3/1985 | Huwiler et al. ............... 548/194 |
| 5,219,684 A | | 6/1993 | Wilkinson et al. |
| 5,529,860 A | | 6/1996 | Skotheim et al. |
| 5,532,077 A | * | 7/1996 | Chu ............................... 429/102 |
| 5,648,187 A | | 7/1997 | Skotheim |
| 5,789,108 A | | 8/1998 | Chu |
| 5,797,428 A | | 8/1998 | Miller |

(Continued)

FOREIGN PATENT DOCUMENTS

| | | | |
|---|---|---|---|
| EP | 0710995 | | 3/2001 |
| EP | 1176659 | * | 1/2002 |

(Continued)

OTHER PUBLICATIONS

Komaba et al, inorganic electrolyte additives to supress the degradation of graphite anodes by dissolved Mn(II) for lithium ion batteries, Mar. 2003, Journal of Power Sources, 1190121, pp. 378-382.*

(Continued)

*Primary Examiner* — Melvin C Mayes
*Assistant Examiner* — Stefanie Cohen
(74) *Attorney, Agent, or Firm* — Meyertons, Hood, Kivlin, Kowert & Goetzel, P.C.; Eric B. Meyertons

(57) ABSTRACT

An electrolyte for a lithium-sulphur battery, the electrolyte comprising a solution of at least one electrolyte salt in at least two aprotic solvents. The components of the solution may be selected so that the solution is eutectic or close to eutectic. Also disclosed is a lithium-sulphur battery including such an electrolyte. By using a eutectic mixture, the performance of the electrolyte and the battery at low temperatures is much improved.

22 Claims, 1 Drawing Sheet

(56) References Cited

U.S. PATENT DOCUMENTS

| | | | |
|---|---|---|---|
| 5,814,420 A | 9/1998 | Chu | |
| 5,919,587 A | 7/1999 | Mukherjee et al. | |
| 5,961,672 A | 10/1999 | Skotheim et al. | |
| 5,962,171 A | 10/1999 | Boguslavsky et al. | |
| 6,030,720 A | 2/2000 | Chu et al. | |
| 6,090,504 A | 7/2000 | Sung et al. | |
| 6,117,590 A | 9/2000 | Skotheim et al. | |
| 6,162,562 A * | 12/2000 | Tsuji et al. | 429/213 |
| 6,174,621 B1 | 1/2001 | Skotheim et al. | |
| 6,201,100 B1 | 3/2001 | Gorkovenko et al. | |
| 6,245,465 B1 * | 6/2001 | Angell et al. | 429/340 |
| 6,302,928 B1 | 10/2001 | Xu et al. | |
| 6,319,633 B1 | 11/2001 | Ikeda et al. | |
| 6,344,293 B1 | 2/2002 | Geronov | |
| 6,358,643 B1 * | 3/2002 | Katz et al. | 429/105 |
| 6,544,691 B1 * | 4/2003 | Guidotti | 429/344 |
| 6,613,480 B1 | 9/2003 | Hwang et al. | |
| 6,632,573 B1 | 10/2003 | Nimon et al. | |
| 6,706,449 B2 | 3/2004 | Mikhaylik et al. | |
| 6,733,924 B1 | 5/2004 | Skotheim et al. | |
| 6,797,428 B1 | 9/2004 | Skotheim et al. | |
| 7,250,233 B2 * | 7/2007 | Choi et al. | 429/231.9 |
| 2002/0034688 A1 | 3/2002 | Chu et al. | |
| 2002/0039677 A1 | 4/2002 | Iwamoto et al. | |
| 2002/0102466 A1 * | 8/2002 | Hwang et al. | 429/326 |
| 2002/0192557 A1 | 12/2002 | Choi et al. | |
| 2003/0073005 A1 | 4/2003 | Kim et al. | |
| 2003/0180611 A1 | 9/2003 | Mikhaylik et al. | |
| 2004/0002002 A1 | 1/2004 | Mitzuta et al. | |
| 2004/0101753 A1 | 5/2004 | Hwang | |
| 2004/0219428 A1 | 11/2004 | Nagayama | |
| 2005/0244693 A1 | 11/2005 | Strutt et al. | |
| 2006/0024579 A1 | 2/2006 | Kolosnitsyn et al. | |
| 2006/0051643 A1 | 3/2006 | Sarkar et al. | |
| 2006/0177741 A1 | 8/2006 | Kolosnitsyn et al. | |
| 2006/0234126 A1 | 10/2006 | Kolosnitsyn et al. | |
| 2007/0072076 A1 | 3/2007 | Kolosnitsyn et al. | |
| 2007/0281210 A1 | 12/2007 | Kolosnitsyn et al. | |
| 2008/0038645 A1 | 2/2008 | Kolosnitsyn et al. | |
| 2008/0100264 A1 | 5/2008 | Kolosnitsyn et al. | |
| 2009/0053565 A1 | 2/2009 | Iacovelli | |

FOREIGN PATENT DOCUMENTS

| | | |
|---|---|---|
| EP | 0764489 | 2/2002 |
| EP | 1420475 A2 | 5/2004 |
| JP | 59194361 | 11/1984 |
| JP | 08069812 | 3/1996 |
| JP | 08138650 | 5/1996 |
| JP | 10284076 | 10/1998 |
| WO | WO 01/97304 | 12/2001 |

OTHER PUBLICATIONS

Chagnes et al, Butyrolactone-ethylene carbonate based electrolytes for lithium ion batteries, Jul. 2003, JOurnal of Applied Electrochemistry, 33, pp. 589-595.*
Bates et al, solvent effects on acid—base behavior: five unchraged acids in water-sulfolane solvents, 1976, journal of solution chemistry, vol. 5, No. 3, pp. 213-222.*
U.S. Appl. No. 11/190,203, filed Jul. 27, 2005, Kolosnitsyn et al.
U.S. Appl. No. 11/332,471, filed Jan. 17, 2006, Kolosnitsyn et al.
U.S. Appl. No. 11/386,113, filed Mar. 22, 2006, Kolosnitsyn et al.
U.S. Appl. No. 60/721,062, filed Sep. 28, 2005, Kolosnitsyn et al.
Yamin H , Peted E , "Electrochemistry of a Nonaqueous Lithium/Sulphur Cell", J of Power Sources, 1983, vol. 9, pp. 281-287.
D Aurbach, E. Zinigrad, Y Cohen, H Teller "A Short Review of Failure Mechanism of Lithium Metal and Lithiated Graphite Anodes in Liquid Electrolyte Solutions"; Solid State Lonics; 2002; vol. 148; pp. 405-416.
Duck-Rye Chang, Suck-Hyun Lee, Sun-Wook Kim, Hee-Tak Kim "Binary Electrolyte Based on Tetra (ethylene glycol) Dimethyl Ether and 1,3-dioxolane for Lithium-Sulphur Battery" J Power Sources, 2002, vol. 112. pp. 452-460.
Yamin H , Penciner J , Gorenshtein A., Elam M , Peled E., "The Electrochemical Behavior of Polysulphides in Tetrahydrofuran", J. of Power Sources, 1985, vol. 14, pp. 129-134.
Yamin H , Gorenshtein A , Penciner J , Sternberg Y , Peled E., "Lithium Sulphur Battery Oxidation/Reduction Mechanisms of Polysulphides in THF solution", J Electrochem Soc . 1988. vol. 135, No. 5, pp. 1045-1048.
International Search Report for PCT/GB2005/002850 mailed Aug. 25, 2005.
J Paris, V Plichon, "Electrochemical Reduction of Sulphur in Dimethylacetamide", Electrochimica Acta, 1981, vol. 26, No. 12, pp. 1823-1829.
UK Search Report under Section 17 taken from Application No. GB 0416708 6.
Levillain E, Gaillard F , Leghie P , Demortier A , Lelieu J.P , "On the Understanding of the Reduction of Sulphur (S8) in Dimethylformamide (DMF)", J. of Electroanalytical Chemistry, 1997, vol. 420, pp. 167-177.
Peled E , Gorenshrein A , Segal m , Sternberg Y; "Rechargeable Lithium-Sulphur Battery (extended abstract )"; J of Power Sources; 1989; vol. 26; pp. 269-271.
Peled E , Sternberg Y , Gorenshtein A , Lavi Y., "Lithium-Sulphur Battery: Evaluation of Dioxolane-Based Electrolytes", J. Electrochem Soc . 1989, vol. 136, No. 6, pp 1621-1625.
Rauh R.D Abraham K M , Pearson G F , Surprenant J.K , Brummer S B "A Lithium/Dissolved Sulphur Battery with an Organic Electrolyte", J. Electrochem.Soc , 1979, vol. 126, No. 4, pp. 523-527.
Rauh R.D., Shuker F S , Marston J M , Brummer S B , "Formation of Lithium Polysulphides in Aprotic Media" J. inorg. Nucl Chem , 1977, vol. 39, pp. 1761-1766.
Shin-Ichi Tobishima, Hideo Yamamoto, Minoru Matsuda, "Study on the Reduction Species of Sulphur by Alkali Metals in Nonaqueous Solvents", Electrochimica Acta, 1997, vol. 42, No. 6, pp. 1019-1029.
Taitiro Fujinaga, Tooru Kuwamoto, Satoshi Okazaki, Masashi Horo, "Electrochemical Reduction of Elemental Sulphur in Acetonitrile", Bull Chem. Soc Jpn 1980, vol. 53, pp. 2851-2855.
U.S. Appl. No. 12/527,701, filed Jun. 18, 2009, Kolosnitsyn et al.
Office Action of U.S. Appl. No. 11/190,203, mailed on Oct. 9, 2009.
Office Action of U.S. Appl. No. 11/190,203, mailed on Apr. 3, 2009.
Office Action of U.S. Appl. No. 11/332,471, mailed on Jul. 31, 2009.
Office Action of U.S. Appl. No. 11/332,471, mailed on Feb. 26, 2009.
Office Action of U.S. Appl. No. 11/332,471, mailed on Aug. 27, 2008.
Office Action of U.S. Appl. No. 11/332,471, mailed on Sep. 28, 2007.
Office Action of U.S. Appl. No. 11/332,471, mailed on Mar. 11, 2008.
Office Action of U.S. Appl. No. 11/332,471, mailed on Feb. 20, 2007.
Office Action of U.S. Appl. No. 11/332,471, mailed on Aug. 21, 2007.
Office Action of U.S. Appl. No. 11/386,113, mailed on Jan. 6, 2009.
Office Action of U.S. Appl. No. 11/386,113, mailed on Aug. 19, 2008.
Office Action of U.S. Appl. No. 11/386,113, mailed on Feb. 5, 2008.
Office Action of U.S. Appl. No. 11/526,876, mailed on Oct. 30, 2009.
Office Action of U.S. Appl. No. 11/889,334, mailed on Aug. 14, 2009.
"Slurry" definition, Merriam Webster's, Collegiate Dictionary (10th Edition), printed Feb. 4, 2008.

* cited by examiner

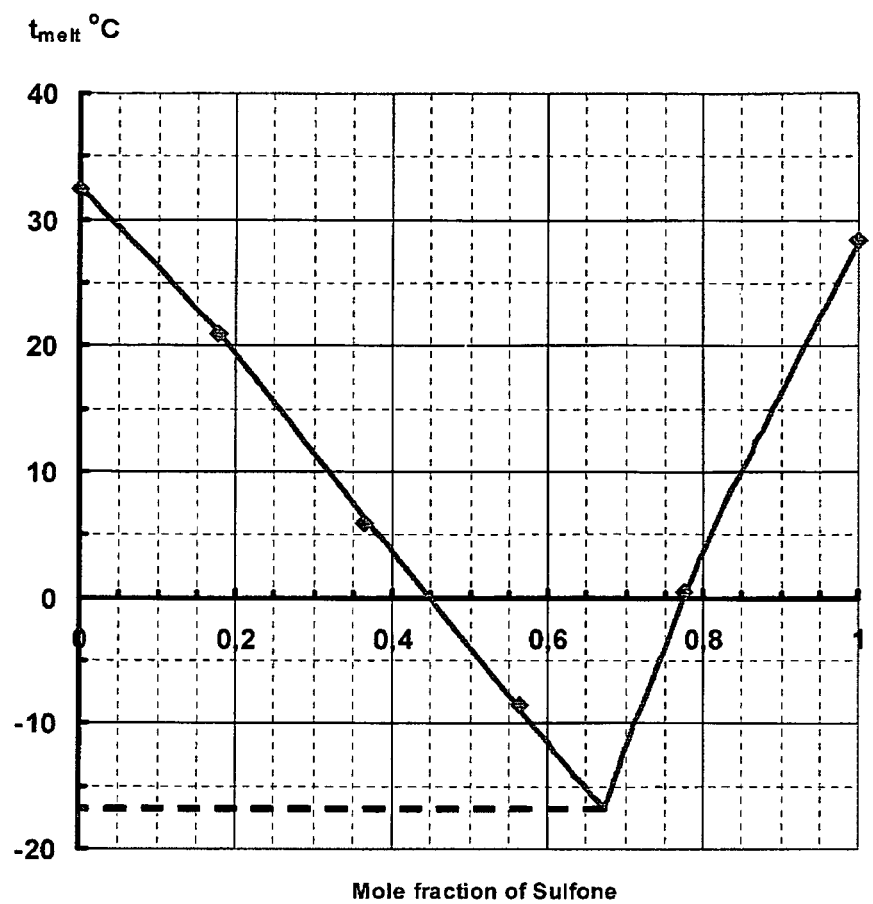

ELECTROLYTE FOR LITHIUM-SULPHUR BATTERIES AND LITHIUM-SULPHUR BATTERIES USING THE SAME

RELATED APPLICATION DATA

The present application claims the benefit of prior Russian patent application no. 2004135236 filed 2 Dec. 2004, UK patent application no. 0504290.8 filed 2 Mar. 2005, and U.S. provisional application 60/657,436 filed on Mar. 2, 2005, entitled "ELECTROLYTE FOR LITHIUM-SULPHUR BATTERIES AND LITHIUM-SULPHUR BATTERIES USING THE SAME", each of which being incorporated by reference herein in their entirety.

FIELD OF THE INVENTION

The present invention pertains generally to the field of non-aqueous electrolyte compositions for use in chemical sources of electric energy incorporating negative electrodes comprising highly reactive alkali metals. More particularly, the present invention pertains to non-aqueous electrolyte compositions which comprise a non-aqueous electrolyte solvents, salts and additives and which are suitable for use in secondary electric current producing cells. The present invention also pertains to chemical sources of electric energy comprising such electrolyte compositions.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which the invention pertains.

As the rapid evolution of batteries continues, and in particular as secondary electric batteries such as lithium-ion and lithium metal batteries become more widely accepted for a variety of uses, the need for safe, long lasting (greater than 300 cycles) rechargeable cells with a wide temperature working range becomes increasingly important. U.S. Pat. Nos. 5,460,905, 5,462,566, 5,582,623 and 5,587,253 describe the basic elements and performance requirements of secondary lithium batteries and their components. A key issue in the development of high energy secondary batteries is the choice of the electrolyte composition to improve the cycle life, temperature working range and safety of the battery.

One of the many problems encountered in the process of producing electrolyte elements is that there is a difficulty in obtaining good cycling efficiency, cycle life, temperature stability, and safety of the cells due to the reactivity of the electrolyte element with the electrode elements, particularly due to reactions with the anode. This is especially true with anodes comprising lithium, which is highly reactive. Reactions of lithium with the electrolyte are undesirable as they lead to self discharge and early battery failure. The reaction of lithium with organic electrolyte solvents may also result in the formation of a surface film on the anode, which subsequently reduces the efficiency of the anode, and may cause uneven plating that can lead to dendrite formation. These factors limit the number of potential electrolyte compositions that may be used to form the electrolyte element.

Desirable electrolyte elements provide high cycling efficiency, good ionic conductivity, good thermal stability, and reasonable cost. The number of times a lithium battery can be recharged is dependent on the efficiency of each charge and discharge cycle of the cell and provides a measure of the cycling efficiency. By cycling efficiency is meant the percent of the lithium (or other anode material) which is replated or reduced onto the anode upon full charging compared to the amount of lithium freshly stripped or oxidized from the anode on the previous full discharging of the cell. Any deviation in this percentage from 100 percent represents lithium which has been lost in terms of useful availability for the charge/discharge performance of the cell. Cycling efficiency is primarily a function of the electrolyte composition quality.

Safety factors affecting the choice of electrolyte solvents include the safety margin against overcharge of the cell. The overcharge safety margin is determined by the voltage difference between completion of recharge of the electrodes and the decomposition of the electrolyte. For instance, in lithium-ion cells, the difference in potential of the anode and cathode is about 4V. Tarascon and Guyomard, J. Electrochem. Soc., 1991, 138, 2864-2868, describe the upper voltage range of a potential scan being limited to 4.5V vs. Li/Li$^+$ because of breakdown of the electrolyte at higher potentials (4.6V vs. Li/Li$^+$) in a 1M LiClO$_4$ 50:50 EC (ethylene carbonate):DME (dimethoxyethane) electrolyte. Also, for example, Ein-Eli et al., J. Electrochem. Soc., 1997, 144, L205-L207, report the onset of electrolyte oxidation at 5.1V for an electrolyte composition comprising 1.2M LiPF$_6$ ethylene carbonate:dimethyl carbonate (2:3 by volume). The need for electrolyte compositions which do not decompose at high potentials is emphasized by the recent recommendation of Zhong et al., J. Electrochem. Soc., 1997, 144, 205-213, that certain lithium-ion cathode materials should be charged to above 5V.

Further factors affecting the choice of electrolyte compositions can be illustrated by reference to cells comprising intercalated carbon electrodes. Ein-Eli et al., J. Electrochem. Soc., 1996, 143, L273-277, reported that graphite electrodes, which are usually sensitive to the composition of the electrolyte solution, can be successfully cycled at high reversible capacities in electrolytes comprising ethylmethyl carbonate. These results are interesting because lithium ions cannot intercalate into graphite in diethyl carbonate solutions and cycle poorly in dimethyl carbonate solutions.

A large number of non-aqueous organic solvents have been suggested and investigated as electrolytes in connection with various types of cells containing lithium electrodes. U.S. Pat. Nos. 3,185,590, 3,578,500, 3,778,310, 3,877,983, 4,163,829, 4,118,550, 4,252,876, 4,499,161, 4,740,436 and 5,079,109 describe many possible electrolyte element combinations and electrolyte solvents, such as borates, substituted and unsubstituted ethers, cyclic ethers, polyethers, esters, sulfones, alkylene carbonates, organic sulfites, organic sulfates, organic nitrites and organic nitro compounds.

One class of organic electrolyte solvents that has received attention as a component of electrolyte elements for electrochemical cells and other devices are the sulfones. Sulfones can be divided into two types: i) cyclic or aromatic sulfones, and ii) aliphatic sulfones. Sulfones form a potentially attractive group of organic solvents which present a high chemical and thermal stability.

The use of the cyclic sulfones, sulfolane (tetramethylenesulfone) along with its alkyl-substituted derivatives, 3-methylsulfolane and 2,4-dimethysulfolane, as electrolyte solvents has been investigated.

U.S. Pat. No. 3,907,597 to Mellors describes a liquid organic electrolyte consisting essentially of sulfolane or its liquid alkyl-substituted derivatives in combination with a co-solvent, preferably a low viscosity solvent such as 1,3-dioxolane, and an ionizable salt. Sulfolane and its liquid alkyl-substituted derivatives, such as 3-methyl sulfolane, are good non-aqueous solvents but have the disadvantage in that they have a relatively high viscosity. Thus, when metal salts are dissolved in these solvents for the purpose of improving the ionic conductivity of the solvents, the viscosity of the solvent and the salt becomes too high for its efficient use as an electrolyte for non-aqueous cell applications. For example, in the '597 patent, sulfolane is used in combination with a low viscosity co-solvent to overcome the viscosity problem.

Japanese patent publications numbers JP 08-298229, published 12, Nov. 1996 and JP 08-298230, published 12, Nov. 1996, describe electrolytes for electric double layer capacitors which comprise sulfolane as one of the electrolyte components.

U.S. Pat. No. 4,725,927 to Morimoto et al. describes the use of sulfolane and its derivatives, 3-methylsulfolane and 2,4-dimethylsulfolane, for use in electric double layer capacitors. However they note that a sulfolane solvent has a high viscosity and a relatively high solidification temperature. Therefore, when it is used for an electrolyte solution, the ionic conductivity tends to be low.

U.S. Pat. No. 5,079,109 to Takami et al. describes a non-aqueous electrolyte solvent blend that may comprise sulfolane as one of the components for use in rechargeable lithium secondary batteries. U.S. Pat. No. 5,219,684 to Wilkinson et al. describes an electrolyte consisting essentially of sulfolane and a glyme for an electrochemical cell comprising a lithium containing anode and a cathode, including $Li_xMnO_2$ cathode active material.

U.S. Pat. No. 4,550,064 to Yen et al. describes electrolytes with sulfolane type solvents which have relatively high dielectric constants and low vapor pressure. Electrolytes containing sulfolane also exhibit improved stripping/plating cycling efficiency because of the excellent reduction stability. However, the use of sulfolane solvents is inhibited by incompatibility of the polar sulfolane liquid with the hydrophobic separator and with the non-polar binder of the cathode. Methods to improve the wettability of the separator and the cathode electrode are described.

The use of the aliphatic sulfones, dimethylsulfone and dipropylsulfone, has been investigated as electrolyte solvents. U.S. Pat. No. 4,690,877 to Gabano et al. reports electrolyte compositions containing at least one aromatic or aliphatic linear sulfone for use in cells operable at temperatures between 100° C. and 200° C. Particularly preferred was dimethylsulfone.

Sulfone-based electrolytes comprising dimethylsulfone, dipropylsulfone, and sulfolane have been described by J. Pereira-Ramos et al., J. Power Sources, 1985, 16, 193-204 for use in lithium intercalation batteries. Molten dimethylsulfone at 150° C. as an electrolyte for a rechargeable γ-$MnO_2$ lithium battery is described by Bach et al., J. Power Sources, 1993, 43-44, 569-575.

U.S. Pat. Nos. 4,060,674 and 4,104,451 to Klemann and Newman describe electrolyte compositions for reversible alkali metal cells which consist essentially of a solvent and an electronically active alkali metal salt. Organic electrolyte solvents employed are generally ones selected from the group consisting of inertly substituted and unsubstituted ethers, esters, sulfones, organic sulfites, organic sulfates, organic nitrites or organic nitro compounds. Examples of organic solvents include propylene carbonate, tetrahydrofuran, dioxolane, furan, sulfolane, dimethyl sulphite, nitrobenzene, nitromethane and the like. The preferred solvents are ethers, and preferred is an electrolyte solvent containing dioxolane.

JP patent publication number JP 09-147913, published 6, Jun. 1997, describes electrolyte solvents containing sulfones of the formula $R^1$—$SO_2$—$R^2$ where $R^1$ and $R^2$ are $C_{1-4}$ alkyl groups, and $R^1$ and $R^2$ are different. Preferably the anodes are Li interaction carbonaceous anodes.

Most electrolyte systems proposed for lithium-ion batteries are not useful in lithium-sulphur batteries. Low molecular weight sulfones are good solvents for the electrolyte systems of Li—S batteries, but these sulfones have high melting temperatures, which means that they cannot be used at low temperatures. U.S. Pat. No. 6,245,465 proposes (as solvents for Li—S batteries) non-cyclic sulfones or fluorinated non-symmetrical non-cyclic sulfones, which possess lower melting temperatures. This patent also discloses the use of mixtures of the aforementioned sulfones with other solvents such as carbonates, glymes, siloxanes and others However, the melting temperatures of the proposed sulfones are not low enough for producing electrolytes with the desirable low-temperature properties. Besides, the proposed sulfones are very expensive, and this restricts their wide use.

Despite the numerous electrolyte solvents proposed for use in rechargeable cells, there remains a need for improved non-aqueous electrolyte compositions that provide beneficial effects during the useful life of the chemical sources of electric energy, and which can be incorporated easily and reliably into the cell without significant extra cost.

SUMMARY

Embodiments of the present invention seek to provide an improved non-aqueous electrolyte composition which is suitable for use in rechargeable cells.

Embodiments of the present invention may also seek to provide a non-aqueous electrolyte contents which have greater overcharge stability Embodiments of the present invention may further seek to provide a non-aqueous electrolyte solvent with high ionic conductivity and low solvent volatility.

Embodiments of the present invention may further seek to provide an improved non-aqueous electrolyte composition for chemical sources of electric energy which comprise alkali metal (including lithium) negative electrodes.

Embodiments of the present invention may further seek to provide non-aqueous electrolyte compositions that are useful with both lithium metal and lithium-ion anodes for secondary battery cells.

Embodiments of the present invention may further seek to provide non-aqueous electrolyte compositions that provide for reversible intercalation of lithium into graphite.

Embodiments of the present invention may further seek to provide non-aqueous electrolyte compositions that increase the cycle life and safety of secondary cells.

Embodiments of the present invention may further seek to provide non-aqueous electrolyte compositions that provide better temperature stability Embodiments of the present invention may further seek to provide secondary lithium cells employing the electrolytes of the present invention.

According to a first aspect of the present invention, there is provided an electrolyte for a lithium-sulphur battery, the electrolyte comprising a solution of at least one electrolyte salt in at least two aprotic solvents, wherein the concentrations of the components of the solution are selected so that the solution is at its eutectic concentration or within at most ±30% of its eutectic concentration.

Preferably, the concentrations of the components of the solution are selected so that the solution is within at most ±20% of its eutectic concentration, and even more preferably within at most ±10% of its eutectic concentration.

The use of eutectic or near-eutectic compositions dramatically improves low temperature performance properties of the electrolyte. A significant reduction of the limit of capacity for work of lithium-sulphur batteries at reduced temperatures is obtained, as is an improvement in low temperature capacity and power characteristics. Moreover, the battery cycle life at low temperatures can be extended.

The aprotic solvents may be selected from a group comprising: tetrahydrofuran, 2-methyltetrahydrofuran, dimethylcarbonate, ethylmethylcarbonate, diethylcarbonate, methylpropylcarbonate, methylpropionate, ethylpropionate, methylacetate, ethylacetate, propylacetate, dimethoxyethane, 1,3-dioxolane, diglyme (2-methoxyethylic ether), tetraglyme, ethylene carbonate, propylene carbonate, γ-butyrolactone and sulfolane.

Alternatively or in addition, the aprotic solvents may be sulfones, preferably with a molecular weight of 94 to 150.

The electrolyte salt may be at least one salt or a mixture of salts selected from a group comprising: lithium hexafluorophosphate ($LiPF_6$), lithium hexafluoroarsenate ($LiAsF_6$), lithium perchlorate ($LiClO_4$), lithium sulfonylimide trifluoromethane ($LiN(CF_3SO_2)_2$)) and lithium trifluorosulfonate ($CF_3SO_3Li$).

The concentration of the at least one electrolyte salt is preferably between 0.1M and a saturation concentration.

The electrolyte may further include one or more organic or non-organic additives for contributing to a solid electrolyte interface (SEI) phase formation on a surface of a negative electrode (anode) and for improving a cycling of the negative electrode.

The additive may be at least one substance or a mixture of substances selected from a group comprising: S, $Li_2S_n$, $CO_2$, $SO_2$, $N_2O$, $Cl_2$, Br, I, and amines.

The amount of additive is preferably between 0.2% and 10% of the total mass of the electrolyte.

According to a second aspect of the present invention, there is provided a lithium-sulphur battery comprising a negative electrode including a lithium-containing material, a positive electrode including a sulphur-containing material and an electrolyte of the first aspect.

The negative electrode may include a negative electrochemically active material selected from a list comprising: metallic lithium, lithium-containing alloy, lithium combined with non-active sulphur, a compound that can reversibly intercalate lithium ions (such as metal powders, lithium metal-carbon and lithium metal-graphite intercalates and mixtures thereof), and compounds that can reversibly go through a reduction-oxidation process with lithium ions.

The positive electrode may include a positive electrochemically active material comprising at least one sulphur-based material selected from a list comprising: elemental sulphur, $Li_2S_n$ compounds (with n≥1), organic sulphur compounds, and sulphur-containing polymers.

BRIEF DESCRIPTION OF THE DRAWINGS

For a better understanding of the present invention and to show how it may be carried into effect, reference shall now be made by way of example to the accompanying drawing, in which:

FIG. 1 is a constitution diagram of a sulfolane-methylpropylsulfone system.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

The following examples are examples only and are not intended to be limiting.

EXAMPLE 1

Low-molecular weight sulfones were synthesized. Their properties were studied and results are displayed in the table.

| Name | Molecular mass | Density $10^3 * kg/m^3$ | viscosity $N * s/m^2, 10^3$ | Molar Volume, $m^3/mole * 10^6$ | Congelation Temperature °C. | Refractive index $\square_D$ | Permittivity $\epsilon$ |
|---|---|---|---|---|---|---|---|
| Methylenesulfone* | 108.2 | 1.1638* | 4.75* | 93.0* | 34.5 | 1.4453 | 57.5 |
| Methylpropylsulfone | 122.2 | 1.1081 | 5.22 | 110.3 | 32.5 | 1.4472 | 40.2 |
| Methylbutyllsulfone | 136.2 | 1.0686 | 6.58 | 127.5 | 30.3 | 1.4485 | 35.1 |
| Sulfolane | 120.2 | 1.2594 | 9.04 | 95.4 | 28.4 | 1.4820 | 42.9 |
| 2,4-Dimethylsulfolane | 148.2 | 1.1263 | 6.74 | 131.6 | −18.0 | 1.4708 | 30.0 |

*t = 40° C.

EXAMPLE 2

A composition was prepared from 0.8 ml of methylpropylsulfone (melting temperature 32.5° C.) and 0.2 ml of sulfolane (melting temperature 28.4° C.). The melting temperature of the mixture was +21° C.

EXAMPLE 3

A composition was prepared from 0.6 ml of methylpropylsulfone (melting temperature 32.5° C.) and 0.4 ml of sulfolane (melting temperature 28.4° C.). The melting temperature of the mixture was +6° C.

EXAMPLE 4

A composition was prepared from 0.4 ml of methylpropylsulfone (melting temperature 32 5° C.) and 0.6 ml of sulfolane (melting temperature 28.4° C.). The melting temperature of the mixture was −8.5° C.

EXAMPLE 5

A composition was prepared from 0.2 ml of methylpropylsulfone (melting temperature 32.5° C.) and 0.8 ml of sulfolane (melting temperature 28.4° C.). The melting temperature of the mixture was +0.5° C.

The constitution diagram of FIG. 1 shows the melting temperatures of pure sulfolane and pure methylpropylsulfone, and also the melting temperatures of mixtures thereof. Extrapolation provides the composition of the eutectic mixture and its melting temperature. The data obtained indicate that the melting temperature of the eutectic mixture is about −17° C., which is about 47° C. lower than that of the initial sulfone components.

EXAMPLE 6

A lithium-sulphur battery was produced, the battery comprising an anode made of metal lithium foil, a Celgard® separator and a sulphur cathode containing elemental sulphur (70% by weight) as a depolarizer, carbon-conducting additive (Ketjenblack EC-600ID, 10% by weight) and a binder (polyethylene oxide with molecular mass 4000000, 20% by weight). The specific energy of the cathode was measured to be 2 mAh/cm$^2$. The assembled battery was filled with an electrolyte in the form of a 1M solution of LiClO$_4$ in sulfolane. The battery was cycled with a current density of 0.3 mA/cm$^2$ at 25° C. The discharge capacity at the first cycle was 1.45 mAh/cm$^2$. The degree of sulphur utilization was 72.5%.

EXAMPLE 7

A lithium-sulphur battery was produced as described in Example 6. The battery was cycled with a current density of 0.3 mA/cm$^2$ at 0° C. The discharge capacity at the first cycle was 0.42 mAh/cm$^2$. The degree of sulphur utilization was 21%.

EXAMPLE 8

A lithium-sulphur battery was produced as described in Example 6. The battery was cycled with a current density of 0.3 mA/cm$^2$ at −10° C. The discharge capacity at the first cycle was 0.02 mAh/cm$^2$ The degree of sulphur utilization was 1%.

EXAMPLE 9

A lithium-sulphur battery was produced as described in Example 6, but using instead as the electrolyte a 1M solution of LiClO$_4$ in a eutectic mixture of sulfolane (2M) and ethylbutylsulfone (1M). The battery was cycled with a current density of 0.3 mA/cm$^2$ at 25° C. The discharge capacity at the first cycle was 1.53 mAh/cm$^2$. The degree of sulphur utilization was 76.5%.

EXAMPLE 10

A lithium-sulphur battery was produced as described in Example 6, but using instead as the electrolyte a 1M solution of LiClO$_4$ in a eutectic mixture of sulfolane (2M) and ethylbutylsulfone (1M). The battery was cycled with a current density of 0.3 mA/cm$^2$ at −10° C. The discharge capacity at the first cycle was 1.01 mAh/cm$^2$. The degree of sulphur utilization was 50.5%

EXAMPLE 11

A lithium-sulphur battery was produced as described in Example 6, but using instead as the electrolyte a 1M solution of LiClO$_4$ in 2,4-dimethylsulfolane. The battery was cycled with a current density 0.3 mA/cm$^2$ at −10° C. The discharge capacity at the first cycle was 0.13 mAh/cm$^2$. The degree of sulphur utilization was 6.5%.

The examples listed above demonstrate the advantages of batteries with electrolytes made of solutions of electrolyte salts in eutectic mixtures of sulfones. At reduced temperatures (0° C. to 10° C.) the discharge capacity and degree of sulphur utilization are respectively 2.5 and 6 times higher than for non-eutectic electrolyte solutions.

The preferred features of the invention are applicable to all aspects of the invention and may be used in any possible combination In one embodiment, the operable temperature range is −40 to +150 degrees Celsius (minus 40 to plus 150 degrees Celsius). In another embodiment, the operable temperature range is −20 to +110 degrees Celsius. In another embodiment, the operable temperature range is −50 to +190 degrees Celsius.

In one embodiment, the operable pressure range is 5 to 10 mmHg to 100 atmospheres, in other words 5 to 76000 mmHg or 0.0066 to 100 atmospheres. In another embodiment, the operable pressure range is 20 mmHg to 50 atmospheres, in other words 20 to 38000 mmHg or 0.026 to 50 atmospheres. In another embodiment, the operable pressure range is approximately one atmosphere.

Throughout the description and claims of this specification, the words "comprise" and "contain" and variations of the words, for example "comprising" and "comprises", mean "including but not limited to", and are not intended to (and do not) exclude other components, integers, moieties, additives or steps.

Throughout the description and claims of this specification, the singular encompasses the plural unless the context otherwise requires. In particular, where the indefinite article is used, the specification is to be understood as contemplating plurality as well as singularity, unless the context requires otherwise.

The invention claimed is:

1. An electrolyte for a lithium-sulphur battery, the electrolyte comprising a solution of at least one electrolyte salt in a mixture of aprotic solvents, the mixture of aprotic solvents consisting essentially of a eutectic mixture of sulfolane and a sulfone or a mixture of sulfolane and the sulfone that is within ±30% of the eutectic concentration of the mixture of the sulfolane and the sulfone.

2. An electrolyte as claimed in claim 1, wherein the mixture of aprotic solvents consists essentially of a mixture of sulfolane and the sulfone that is within ±20% of the eutectic concentration of the mixture of the sulfolane and the sulfone.

3. An electrolyte as claimed in claim 1, wherein the mixture of aprotic solvents consists essentially of a mixture of sulfolane and the sulfone that is within ±10% of the eutectic concentration of the mixture of the sulfolane and the sulfone.

4. An electrolyte as claimed in claim 1, wherein the sulfone has a molecular weight of about 94 to 150.

5. An electrolyte as claimed in claim 1, wherein the electrolyte salt is at least one salt or a mixture of salts selected from a group comprising: lithium hexafluorophosphate (LiPF$_6$), lithium hexafluoroarsenate (LiAsF$_6$), lithium perchlorate (LiClO$_4$), lithium sulfonylimide trifluoromethane (LiN(CF$_3$SO$_2$)$_2$) and lithium trifluorosulfonate (CF$_3$SO$_3$Li).

6. An electrolyte as claimed in claim 1, wherein the concentration of the at least one electrolyte salt is between 0.1M and a saturation concentration, at operable temperature and pressure.

7. An electrolyte as claimed in claim 1, further including as an additive one or more organic or non-organic additives for contributing to a solid electrolyte interface (SET) phase formation on a surface of a negative electrode and for improving a cycling of the negative electrode.

8. An electrolyte as claimed in claim 7, wherein said additive is at least one substance or a mixture of substances selected from the group consisting of: S, $Li_2S_n$, $CO_2$, $SO_2$, $N_2O$, $Cl_2$, Br, I, and amines.

9. An electrolyte as claimed in claim 7, wherein the amount of additive is between 0.2% and 10% of the total mass of the electrolyte.

10. An electrolyte as claimed in claim 1, wherein the aprotic solvent is a eutectic mixture of sulfolane and ethylbutylsulfone.

11. An electrolyte as claimed in claim 1, wherein the aprotic solvent is a eutectic mixture of sulfolane and methylpropylsulfone.

12. An electrolyte for a lithium-sulphur battery, the electrolyte comprising a solution of at least one electrolyte salt in a mixture of aprotic solvents, the mixture of aprotic solvents consisting essentially of a eutectic mixture of sulfolane and a sulfone.

13. A lithium-sulphur battery comprising a negative electrode including a lithium-containing material, a positive electrode including a sulphur-containing material and an electrolyte comprising a solution of at least one electrolyte salt in a mixture of aprotic solvents, the mixture of aprotic solvents consisting essentially of a eutectic mixture of sulfolane and a sulfone or a mixture of sulfolane and the sulfone that is within ±30% of the eutectic concentration of the mixture of the sulfolane and the sulfone.

14. A battery as claimed in claim 13, wherein the negative electrode includes a negative electrochemically active material selected from a list comprising: metallic lithium, lithium-containing alloy, lithium combined with non-active sulphur, a compound that can reversibly intercalate lithium ions (including but not limited to metal powders, lithium metal-carbon and lithium metal-graphite intercalates and mixtures thereof), and compounds that can reversibly go through a reduction-oxidation process with lithium ions.

15. A battery as claimed in claim 13, wherein the positive electrode includes a positive electrochemically active material comprising at least one sulphur-based material selected from a list comprising: elemental sulphur, $Li_2S_n$ compounds (with n≥1), organic sulphur compounds, and sulphur-containing polymers.

16. A battery as claimed in claim 13, wherein the sulfone has a molecular weight of about 94 to 150.

17. A battery as claimed in claim 13, wherein the electrolyte salt is at least one salt or a mixture of salts selected from a group comprising: lithium hexafluorophosphate ($LiPF_6$), lithium hexafluoroarsenate ($LiAsF_6$), lithium perchlorate ($LiClO_4$), lithium sulfonylimide trifluoromethane ($LiN(CF_3SO_2)_2$) and lithium trifluorosulfonate ($CF_3SO_3Li$).

18. A battery as claimed in claim 13, wherein the concentration of the at least one electrolyte salt is between 0.1M and a saturation concentration, at operable temperature and pressure.

19. A battery as claimed in claim 13, further including as an additive one or more organic or non-organic additives for contributing to a solid electrolyte interface (SET) phase formation on a surface of a negative electrode and for improving a cycling of the negative electrode.

20. A battery as claimed in claim 13, wherein the aprotic solvent is a eutectic mixture of sulfolane and ethylbutylsulfone.

21. A battery as claimed in claim 13, wherein the aprotic solvent is a eutectic mixture of sulfolane and methylpropylsulfone.

22. A lithium-sulphur battery comprising a negative electrode including a lithium-containing material, a positive electrode including a sulphur-containing material and an electrolyte comprising a solution of at least one electrolyte salt in a mixture of aprotic solvents, the mixture of aprotic solvents consisting essentially of a eutectic mixture of sulfolane and a sulfone.

* * * * *